(12) United States Patent
Williams

(10) Patent No.: US 9,776,491 B1
(45) Date of Patent: Oct. 3, 2017

(54) RETRACTABLE VEHICLE COVERING ASSEMBLY

(71) Applicant: Gaylord Williams, Mount Vernon, NY (US)

(72) Inventor: Gaylord Williams, Mount Vernon, NY (US)

( * ) Notice: Subject to any disclaimer, the term of this patent is extended or adjusted under 35 U.S.C. 154(b) by 0 days.

(21) Appl. No.: 15/175,250

(22) Filed: Jun. 7, 2016

(51) Int. Cl.
*B60J 11/04* (2006.01)

(52) U.S. Cl.
CPC ..................... *B60J 11/04* (2013.01)

(58) Field of Classification Search
CPC ................... B60J 11/00; B60J 11/04
USPC ............ 296/136.01, 136.04, 136.1, 136.11, 296/136.13, 98
See application file for complete search history.

(56) References Cited

U.S. PATENT DOCUMENTS

| | | |
|---|---|---|
| 4,856,842 A | 8/1989 | Ross et al. |
| 4,925,234 A | 5/1990 | Park et al. |
| 4,951,993 A * | 8/1990 | Taboada ............... B60J 11/00 150/166 |
| 5,022,700 A * | 6/1991 | Fasiska ................ B60J 11/02 160/26 |
| 5,328,230 A | 7/1994 | Curchod |
| 5,472,257 A * | 12/1995 | Kaya .................... B60J 11/02 150/166 |
| 5,618,073 A * | 4/1997 | Criscione ............. B60J 11/06 280/770 |
| 6,017,078 A | 1/2000 | Stagner |
| 6,672,643 B1 | 1/2004 | Brodskiy et al. |
| 6,964,446 B2 | 11/2005 | Porter |
| 7,464,982 B1 | 12/2008 | Lin et al. |
| D692,367 S | 10/2013 | Aronovich |
| D694,169 S | 11/2013 | Fontanilla |

FOREIGN PATENT DOCUMENTS

WO   WO2010073070   7/2010

* cited by examiner

*Primary Examiner* — Dennis H Pedder

(57) ABSTRACT

A retractable vehicle covering assembly includes a track that may be coupled to a rear side of a vehicle. A covering unit is removably coupled to the track and the covering unit may be manipulated. The covering unit is positioned in a deployed position. The covering unit extends over the vehicle and engages a front side of the vehicle. Thus, the covering unit may cover the vehicle. The covering unit is positioned in a stored position having the covering unit being folded along the track.

8 Claims, 5 Drawing Sheets

RETRACTABLE VEHICLE COVERING ASSEMBLY

BACKGROUND OF THE DISCLOSURE

Field of the Disclosure

The disclosure relates to covering assemblies and more particularly pertains to a new covering assembly for selectively covering a vehicle.

SUMMARY OF THE DISCLOSURE

An embodiment of the disclosure meets the needs presented above by generally comprising a track that may be coupled to a rear side of a vehicle. A covering unit is removably coupled to the track and the covering unit may be manipulated. The covering unit is positioned in a deployed position. The covering unit extends over the vehicle and engages a front side of the vehicle. Thus, the covering unit may cover the vehicle. The covering unit is positioned in a stored position having the covering unit being folded along the track.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
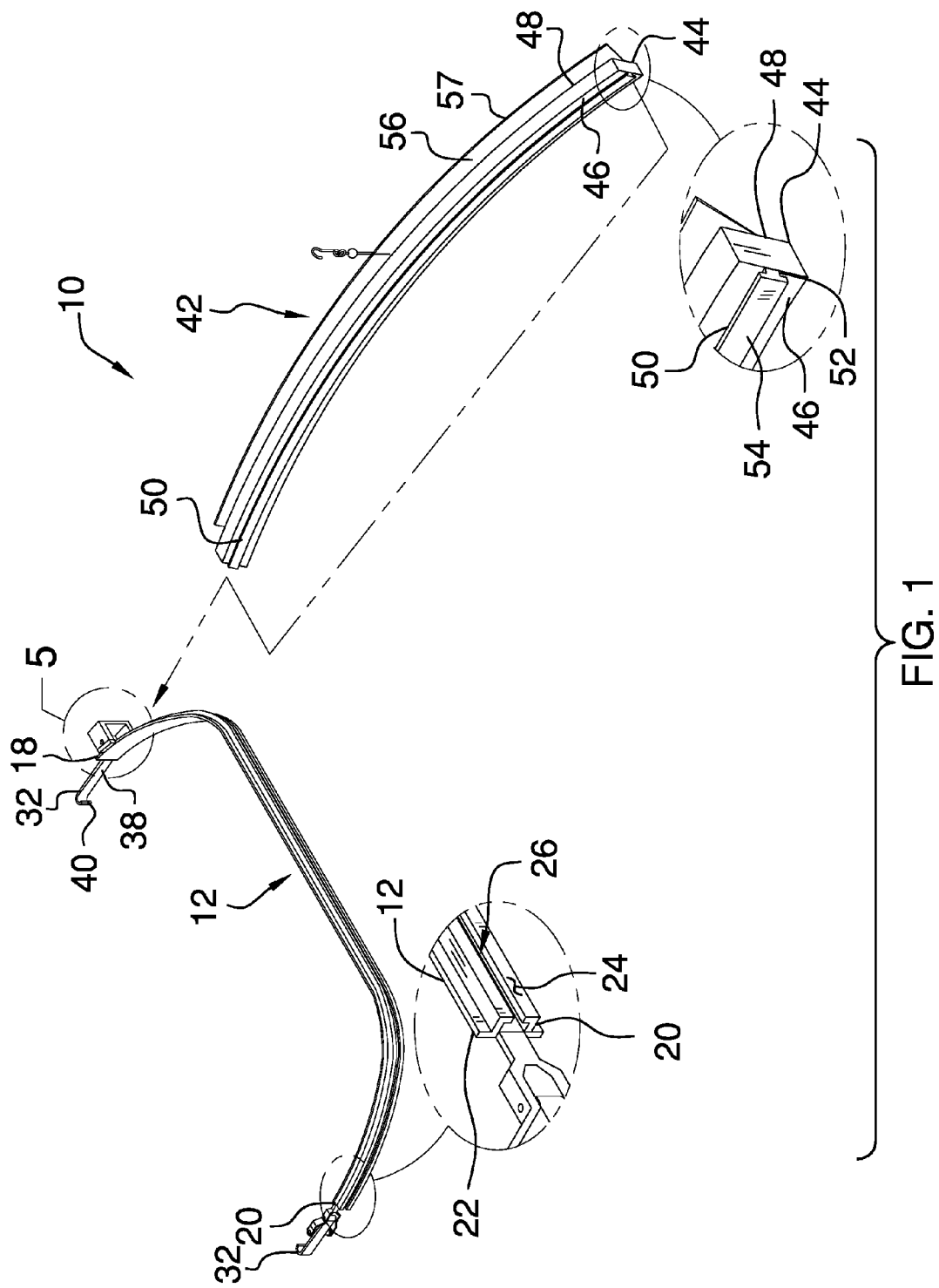
FIG. 1 is a perspective view of a retractable vehicle covering assembly according to an embodiment of the disclosure.
Figure 2:
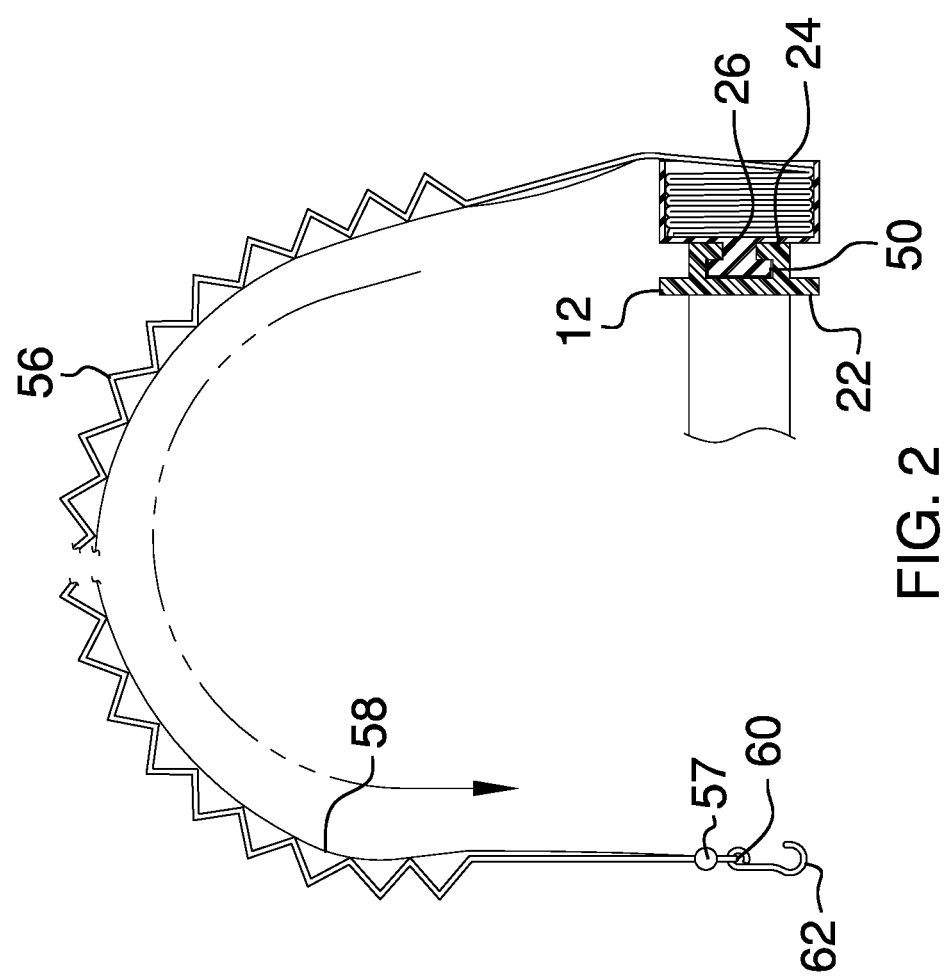
FIG. 2 is a left side cut-away view of a covering unit of an embodiment of the disclosure.
Figure 3:
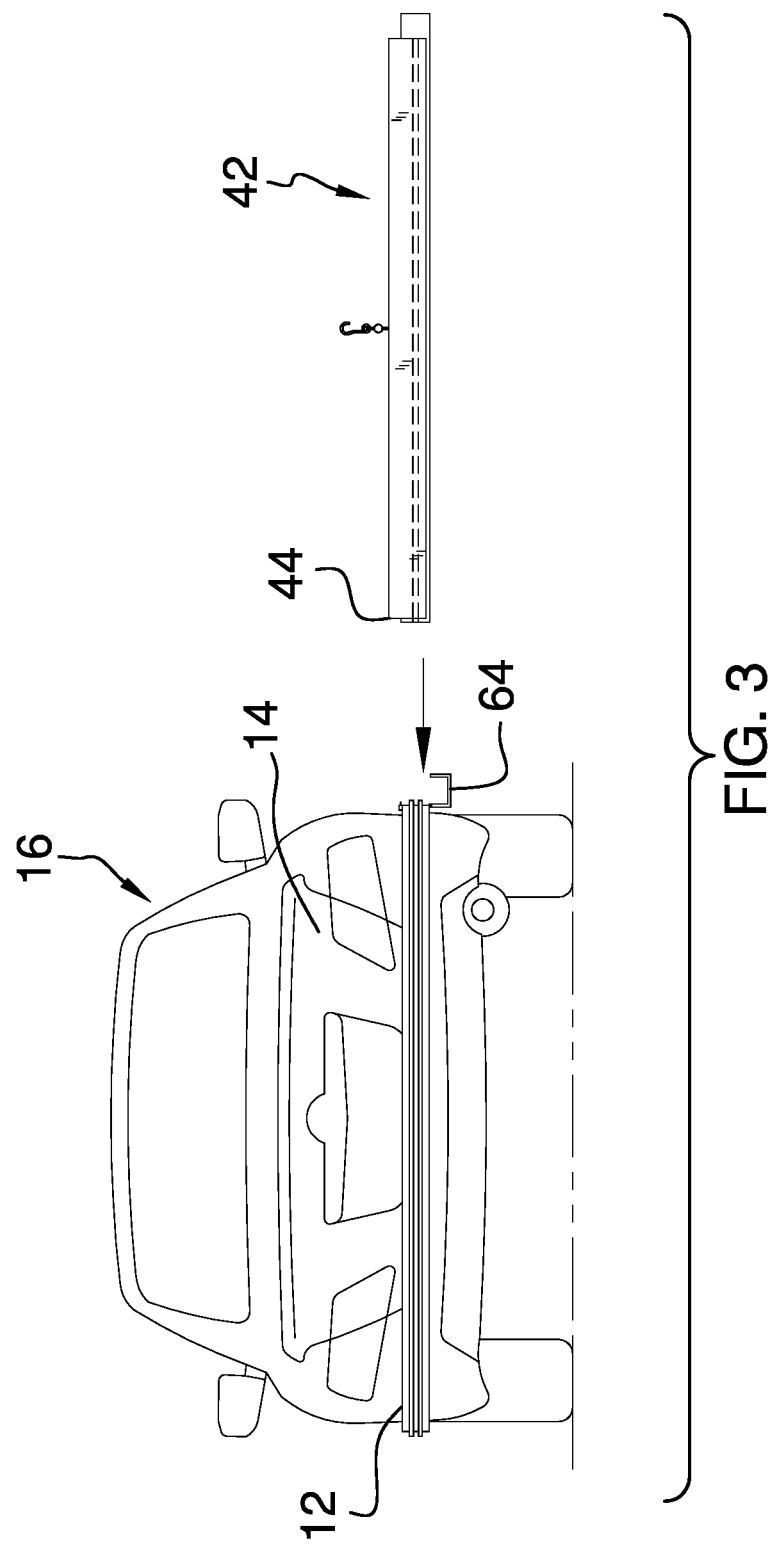
FIG. 3 is a back perspective in-use view of an embodiment of the disclosure.
Figure 4:
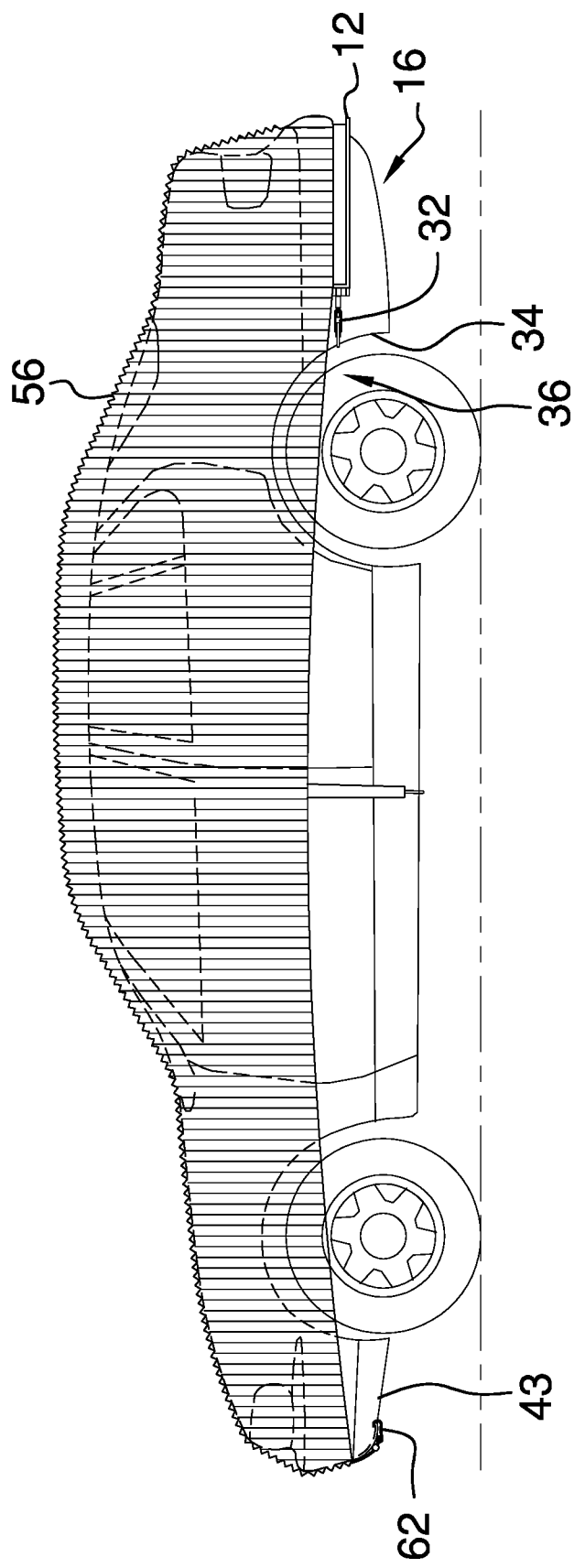
FIG. 4 is a left side perspective in-use view of an embodiment of the disclosure.
Figure 5:
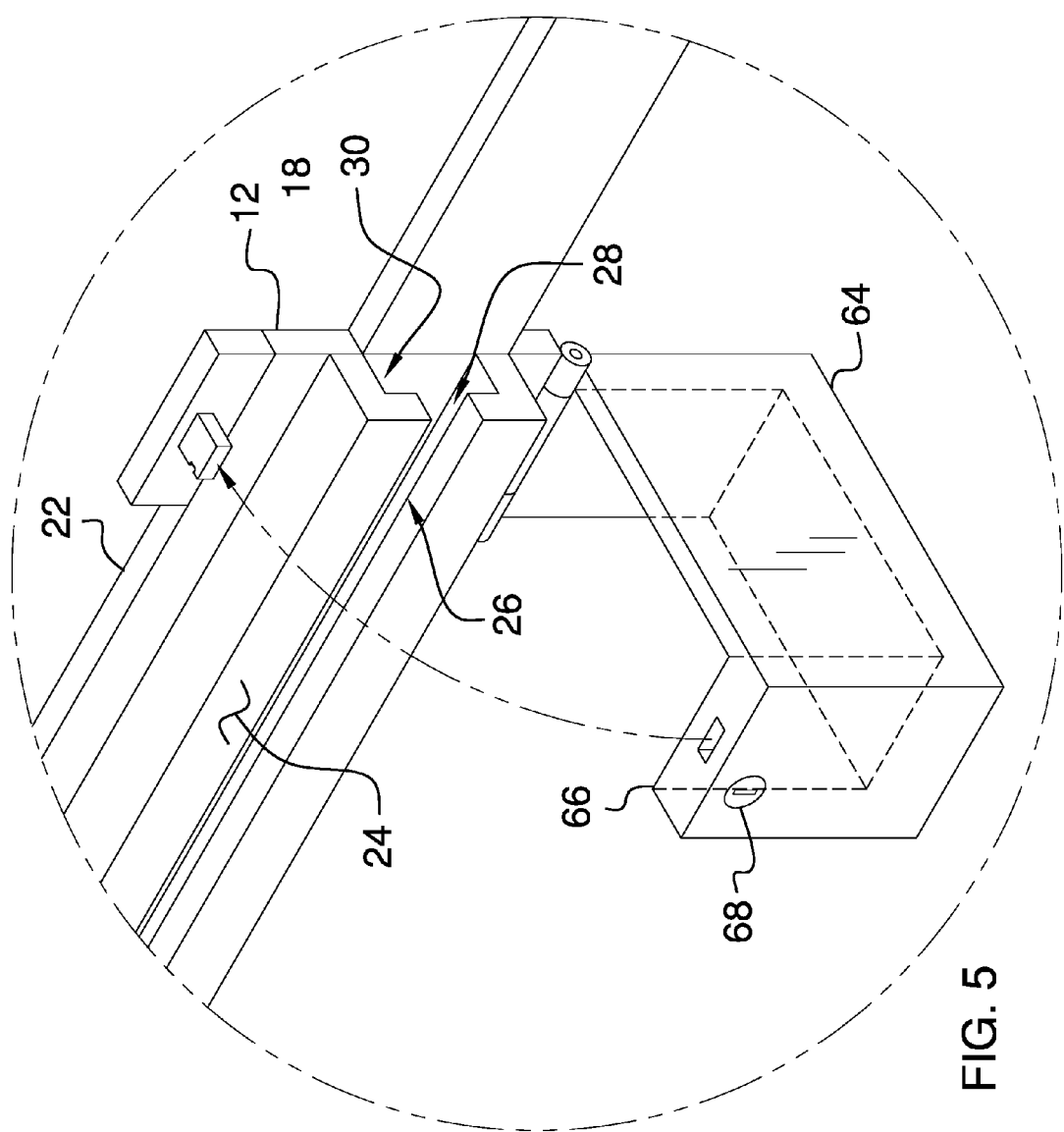
FIG. 5 is a detail view taken from circle 5 of FIG. 1 of an embodiment of the disclosure.

With reference now to the drawings, and in particular to FIGS. 1 through 5 thereof, a new covering assembly embodying the principles and concepts of an embodiment of the disclosure and generally designated by the reference numeral 10 will be described.

As best illustrated in FIGS. 1 through 5, the retractable vehicle covering assembly 10 generally comprises a track 12 that may be coupled to a rear side 14 of a vehicle 16. The vehicle 16 may be a passenger vehicle 16 or the like. The track 12 is positioned to be coextensive with the rear side 14 of the vehicle 16. Additionally, the track 12 may be comprised of a flexible material thereby facilitating the track 12 to follow contours of the vehicle 16.

The track 12 has a first end 18, a second end 20, a first surface 22 and a second surface 24. The first surface 22 may be coupled to the rear side 14 of the vehicle 16. Moreover, the track 12 may be horizontally oriented. The second surface 24 has a slot 26 extending toward the first surface 22 and the slot 26 extends through the first end 18 and the second end 20.

The slot 26 has a first portion 28 and a second portion 30. The first portion 28 intersects the second portion 30. The second portion 30 is oriented transverse with respect to the first portion 28. Thus, the slot 26 has a T-shaped cross section taken along a line extending between the first end 18 and the second end 20.

A pair of latches 32 is provided. Each of the latches 32 is movably coupled to the track 12 and each of the latches 32 may be manipulated. Each of the latches 32 is positioned on an associated one of the first end 18 and the second end 20. Thus, each of the latches 32 may engage a bounding edge 34 of an associated one of a pair of wheel wells 36 in the vehicle 16. Thus, the track 12 may be retained on the rear side 14.

Each of the latches 32 may include a grapple 38 extending away from an associated one of the first end 18 and the second end 20. Each of the grapples 38 may have a distal end 40 with respect to the associated first 18 and second 20 ends. Each of the grapples 38 may curve inwardly adjacent to the distal end 40 corresponding to the grapples 38. Thus, the distal end corresponding to each of the grapples 38 may frictionally engage the associated wheel well 36.

A covering unit 42 is provided. The covering unit 42 is removably coupled to the track 12 and the covering unit 42 may be manipulated. The covering unit 42 is positioned in a deployed position. The covering unit 42 extends over the vehicle 16 and engages a front side 43 of the vehicle 16. Thus, the covering unit 42 may cover the vehicle 16. The covering unit 42 is positioned in a stored position having the covering unit 42 being folded along the track 12.

The covering unit 42 comprises a housing 44 that has a first side 46 and a second side 48. The housing 44 is substantially hollow and the second side 48 is open. The housing 44 is longitudinally elongated. A tab 50 is coupled to the first side 46 and the tab 50 is coextensive with the housing 44. The housing 44 may be comprised of a flexible material thereby facilitating the housing 44 to follows contours of the vehicle 16.

The tab 50 includes a stem 52 and a head 54. The stem 52 extends away from the first side 46 and the head 54 is oriented transverse with respect to the stem 52. Thus, the tab 50 is complementary with the slot 26 in the track 12. The stem 52 slidably engages the first portion 28 of the slot 26. The head 54 slidably engages the second portion 30 of the slot 26. Thus, the housing 44 is removably coupled to and coextensive with the track 12.

A shade 56 is positioned within the housing 44 and the shade 56 is selected deployed outwardly from the second side 48 of the housing 44. The shade 56 has a distal end 57 with respect to the housing 44 and the shade 56 is pleated between the housing 44 and the distal end. The shade 56 extends over the vehicle 16 and engages the front side 43 of the vehicle 16 when the covering unit 42 is in the deployed position. The shade 56 is folded and stored in the housing 44 when the covering unit 42 is in the stored position.

A biasing member 58 is coupled between the housing 44 and the distal end of the shade 56. The biasing member 58 biases the shade 56 to be stored within the housing 44. The biasing member 58 has a distal end 60 with respect to the housing 44. The biasing member 58 may comprise an elastic cord or the like.

A hook 62 is provided. The hook 62 is coupled to the distal end 60 corresponding to the biasing member 58. The hook 62 may engage the front side 43 of the vehicle 16 when the covering unit 42 is in the deployed position. Thus, the shade 56 may be retained to cover the vehicle 16.

A box 64 is hingedly coupled to the track 12 and the box 64 may be manipulated. The box 64 is positioned on the first end 18 of the track 12. The box 64 has a first side 66 and the first side 66 of the box is open. The box 64 is oriented having the first side 46 of the box 64 facing the second end 20 of the track 12.

The box 64 is positioned in a closed position having the box 64 covering the first end 18 of the track 12. Thus, the housing 44 is inhibited from being removed from the track 12. The box 64 frictionally engages the track 12 to retain the box 64 in the closed position. The box 64 is positioned in an open position having the first end 18 of the track 12 being exposed such that the housing 44 is removable from the track 12.

A lock 68 may be coupled to the box 64 and the lock 68 may engage the track 12 when the box 64 is in the closed position. The lock 68 may insertably receive a key. Thus, the lock 68 may be manipulated to selectively disengage the track 12. The lock 68 may inhibit the box 64 from being positioned in the open position.

In use, the track 12 is positioned on the rear side 14 of the vehicle 16 and each of the latches 32 is manipulated to engage the vehicle 16. Thus, the track 12 is removably coupled to the rear side 14 of the vehicle 16. The hook 62 is gripped and the cover is extended outwardly from the housing 44. The shade 56 is manipulated to extend over the vehicle 16. The hook 62 is manipulated to engage the front side 43 of the vehicle 16. Thus, the shade 56 covers the vehicle 16. The hook 62 is selectively released from the front side 43 of the vehicle 16. The biasing member 58 biases the cover to fold within the housing 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A retractable vehicle covering assembly being configured to be movably coupled to a vehicle, said assembly comprising:

a track being configured to be coupled to a rear side of a vehicle, said track having a first end, a second end, a first surface and a second surface, said first surface being configured to be coupled to the rear side of the vehicle having said track being horizontally oriented, said second surface having a slot extending toward said first surface, said slot extending through said first end and said second end;

a covering unit being removably coupled to said track wherein said covering unit is configured to be manipulated, said covering unit being positioned in a deployed position having said covering unit extending over the vehicle and engaging a front end of the vehicle thereby facilitating said covering unit to cover the vehicle, said covering unit being positioned in a stored position having said covering unit being folded along said track, said covering unit including a housing being removably coupled to said track; and a box being hingedly coupled to said track wherein said box is configured to be manipulated, said box being positioned on said first end of said track, said box having a first side, said first side being open, said first side being oriented to face said second end of said track, said box being positioned in a closed position having said box covering said first end of said track such that said housing is inhibited from being removed from said track, said box being positioned in an open position having said first end being exposed such that said housing is removable from said track.

2. The assembly according to claim 1, wherein said slot has a first portion and a second portion, said first portion intersecting said second portion, said second portion being oriented transverse with respect to said first portion such that said slot has a T-shaped cross section taken along a line extending between said first end and said second end.

3. The assembly according to claim 1, further comprising a pair of latches, each of said latches being movably coupled to said track wherein each of said latches is configured to be manipulated, each of said latches being positioned on an associated one of said first end and said second end wherein each of said latches is configured to engage a bounding edge of an associated one of a pair of wheel wells in the vehicle thereby facilitating said track to be retained on the rear side.

4. The assembly according to claim 1, wherein said covering unit comprises:

said housing having a first side and a second side, said housing being substantially hollow, said second side being open; and a tab being coupled to said first side, said tab including a stem and a head, said stem extending away from said first side, said head being oriented transverse with respect to said stem such that said tab is complementary with said slot in said track, said stem slidably engaging said slot such that said housing is removably coupled to and coextensive with said track.

5. The assembly according to claim 4, said covering unit comprising a shade being positioned within said housing, said shade being selected deployed outwardly from said second side of said housing such that said shade has a distal end with respect to said housing, said shade being pleated between said housing and said distal end, said shade being configured to extend over the vehicle and engage the front side of the vehicle when said covering unit is in said deployed position, said shade being folded and stored with said housing when said covering unit is in said stored position.

6. The assembly according to claim 5, further comprising a biasing member being coupled between said housing and said distal end of said shade such that said biasing member biases said shade to be stored within said housing, said biasing member having a distal end with respect to said housing.

7. The assembly according to claim 6, further comprising a hook being coupled to said distal end corresponding to said biasing member wherein said hook is configured to engage the front side of the vehicle when said covering unit is in said deployed position thereby facilitating said shade to be retained to cover the vehicle.

8. A retractable vehicle covering assembly being configured to be movably coupled to a vehicle, said assembly comprising:

a track being configured to be coupled to a rear side of a vehicle, said track having a first end, a second end, a first surface and a second surface, said first surface being configured to be coupled to the rear side of the vehicle having said track being horizontally oriented, said second surface having a slot extending toward said first surface, said slot extending through said first end and said second end, said slot having a first portion and a second portion, said first portion intersecting said second portion, said second portion being oriented transverse with respect to said first portion such that said slot has a T-shaped cross section taken along a line extending between said first end and said second end;

a pair of latches, each of said latches being movably coupled to said track wherein each of said latches is configured to be manipulated, each of said latches being positioned on an associated one of said first end and said second end wherein each of said latches is configured to engage a bounding edge of an associated one of a pair of wheel wells in the vehicle thereby facilitating said track to be retained on the rear side; and a covering unit being removably coupled to said track wherein said covering unit is configured to be manipulated, said covering unit being positioned in a deployed position having said covering unit extending over the vehicle and engaging a front end of the vehicle thereby facilitating said covering unit to cover the vehicle, said covering unit being positioned in a stored position having said covering unit being folded along said track, said covering unit comprising:

a housing having a first side and a second side, said housing being substantially hollow, said second side being open, a tab being coupled to said first side, said tab including a stem and a head, said stem extending away from said first side, said head being oriented transverse with respect to said stem such that said tab is complementary with said slot in said track, said stem slidably engaging said slot such that said housing is removably coupled to and coextensive with said track, a shade being positioned within said housing, said shade being selected deployed outwardly from said second side of said housing such that said shade has a distal end with respect to said housing, said shade being pleated between said housing and said distal end, said shade being configured to extend over the vehicle and engage the front side of the vehicle when said covering unit is in said deployed position, said shade being folded and stored with said housing when said covering unit is in said stored position, a biasing member being coupled between said housing and said distal end of said shade such that said biasing member biases said shade to be stored within said housing, said biasing member having a distal end with respect to said housing, and a hook being coupled to said distal end corresponding to said biasing member wherein said hook is configured to engage the front side of the vehicle when said covering unit is in said deployed position thereby facilitating said shade to be retained to cover the vehicle; and a box being hingedly coupled to said track wherein said box is configured to be manipulated, said box being positioned on said first end of said track, said box having a first side, said first side being open, said first side being oriented to face said second end of said track, said box being positioned in a closed position having said box covering said first end of said track such that said housing is inhibited from being removed from said track, said box being positioned in an open position having said first end being exposed such that said housing is removable from said track.

\* \* \* \* \*